Figure 1:
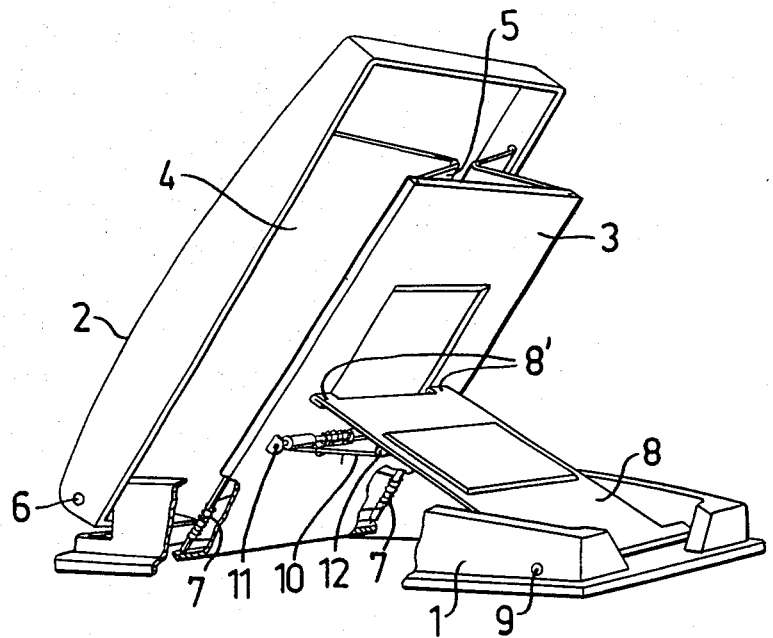

United States Patent [19]

Dahlgren

[11] Patent Number: 4,515,454
[45] Date of Patent: May 7, 1985

[54] FOCUSING HOOD FOR CAMERAS

[75] Inventor: Lennart G. O. Dahlgren, V. Frölunda, Sweden

[73] Assignee: Victor Hasselblad Aktiebolag, Gothenburg, Sweden

[21] Appl. No.: 536,857

[22] Filed: Sep. 28, 1983

[51] Int. Cl.³ .............................................. G03B 11/04
[52] U.S. Cl. .................................................... 354/287
[58] Field of Search ........................................ 354/287

[56] References Cited

U.S. PATENT DOCUMENTS

| | | | |
|---|---|---|---|
| 2,839,977 | 6/1958 | Heidecke et al. | 354/287 |
| 2,912,912 | 11/1959 | Heidecke et al. | 354/287 |
| 3,630,135 | 12/1971 | Sato | 354/287 |
| 3,677,162 | 7/1972 | Yokozato | 354/287 |

FOREIGN PATENT DOCUMENTS 1005833  4/1957  Fed. Rep. of Germany ...... 354/287

Primary Examiner—A. A. Mathews
Attorney, Agent, or Firm—Sherman & Shalloway

[57] ABSTRACT

This invention relates to a focusing hood for cameras comprising a cover (2) mounted at the camera box for being folded up, and lateral pieces and a back piece (3) mounted at the cover, the respective lateral piece divided into a front lateral piece portion (4) and a rear lateral piece portion (5) hingedly attached to each other. The back piece (3) further is connected to the box by means of a link hinged at the box and back piece. The invention is characterized in that the link consists of a first portion (8) hingedly mounted on the box and a second portion (10) hingedly mounted at the back piece (3) on a level vertically beneath the center thereof at folded-out focusing hood, and at the first portion (8) substantially on a level at half the height of the back piece.

7 Claims, 8 Drawing Figures

FOCUSING HOOD FOR CAMERAS

This invention relates to a focusing hood for cameras comprising a cover foldable upward at the camera body and lateral pieces and a back piece mounted thereon. Each lateral piece is divided into a front and a rear lateral piece portion hingedly mounted relative to each other.

For fixing the focusing hood in a folded-up position in order to prevent it from swinging freely about the lower edge of the cover hinged at the camera box, and for guiding the folding-up and folding-down movements of the focusing hood, it is known to provide a guide plate which is hinged both at the camera box immediately outside the back piece of the focusing hood and at half the height of the back piece.

This implies that during the folding-up and folding-down procedure the lower edge of the back piece describes during movement a downwardly directed arc. In addition to the normal over-all height for the folded-together focusing hood, thus, a free space is required for the lower rear edge of the hood during the folding procedure. This in and of itself requires that the frame located above the camera box which carries the focusing hood and conceals the hood portions in folded-together state, must have a height, which exceeds the height conditioned only by said over-all height.

The present invention as disclosed herein renders it possible with the type of focusing hood described above to maintain a frame height depending only on the over-all height of the portions of the focusing hood. Due to the invention, furthermore, it is possible in an expedient way to provide in the cover thereof an exchangeable magnifier, which at demand can be folded out in the focusing hood.

Figure 2:
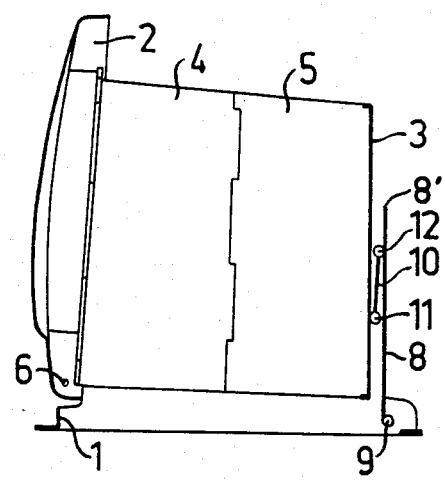
Figure 3A:
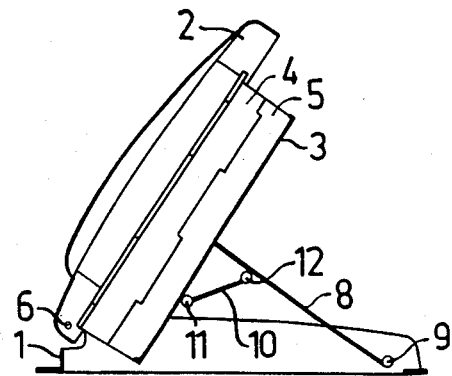
Figure 3B:
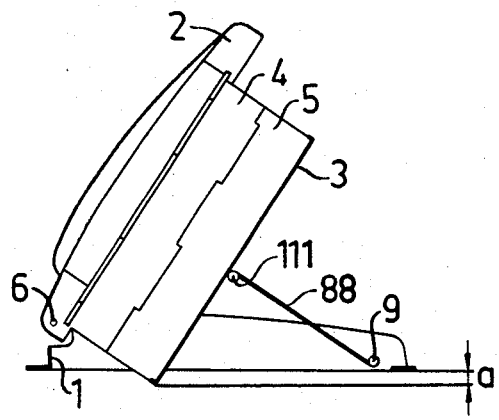
Figure 4:
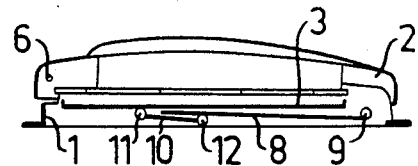
Figure 5:
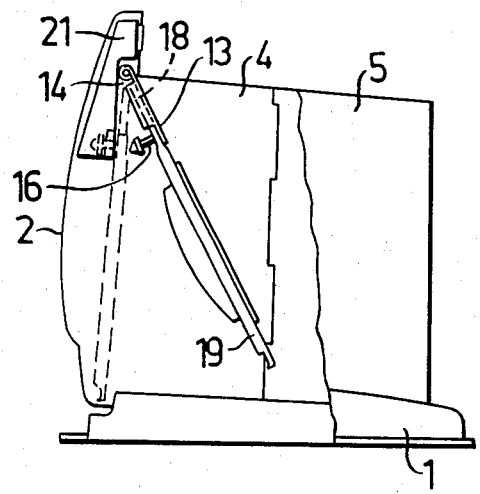
Figure 6:
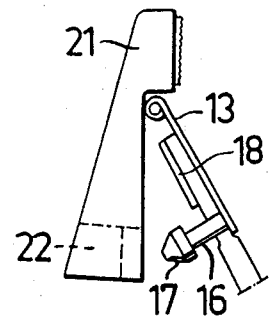
Figure 7:
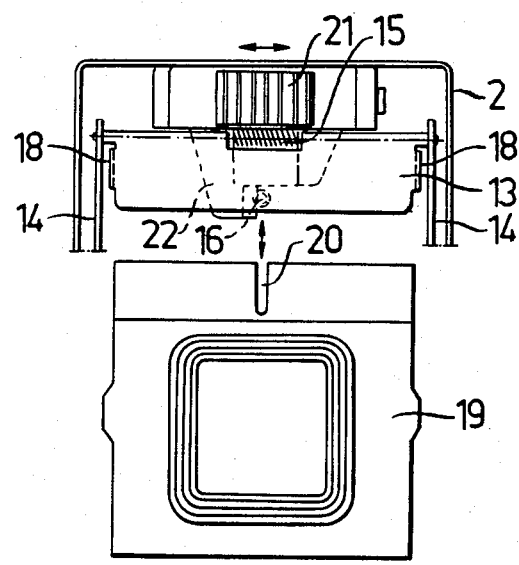

The invention is described in the following by way of example and with reference to the accompanying drawings, in which FIG. 1 is a perspective and partially cut-open view of the focusing hood according to the invention, FIG. 2 is a schematic lateral view of the hood, FIG. 3a shows the hood according to the invention during the folding-together movement, FIG. 3b shows a hood of previously known type in a position corresponding to that shown for the hood in FIG. 3a, FIG. 4 shows the hood according to the invention in folded-together position, FIG. 5 shows a focusing hood provided with a magnifier according to the invention, FIG. 6 shows a detail on an enlarged scale, and FIG. 7 shows parts of the cover and a magnifier.

The focusing hood and its parts are described with reference to FIG. 1, in which 1 designates a mounting frame, which is attached in a conventional manner to the camera box and encloses the focusing screen (box and screen are not shown). The cover is designated by 2, and the back piece by 3. Between the cover 2 and back piece 3 lateral pieces are hingedly mounted, each of which is centrally articulatedly divided into lateral piece portions 4 and 5. The aforesaid design and the pivotal mounting of the cover on the mounting frame are a conventional design of a focusing hood, which in other respects is clearly apparent from the Figures. 7 designates torsion springs, which tend to fold out the lateral pieces in relation to the back piece.

For easier understanding of the invention, the known art will be described with reference to FIG. 3b. At half the height of the back piece 3 a guide plate 88 is hingedly mounted at 111, which at its other end at 9 is pivotally mounted in the frame 1. The pivot axle 9, seen at folded-up focusing hood, is located immediately outside the plane of the back piece, and the guide plate 88 has such a length, that it substantially corresponds to half the height of the back piece. The position of the pivot axle 9 and the position of the pivot axle 111, and thereby the length of the guide plate 88, are determined by the fact that the guide plate shall be concealed by the cover 2 in folded-together position of the focusing hood, and that this shall have its definite orientation in the two outer positions, i.e. substantially vertically folded-up focusing hood with the parts substantially horizontal in folded-together state. This geometrically bound relation implies that at the folding-up or folding-together procedure, as appears from FIG. 3b showing an "intermediate position" during such a procedure, the lower edge of the back piece 3 moves along a downward directed arc extending through the distance a beneath the lower plane for a frame, which is drawn in this case and intended for a focusing hood according to the invention.

According to the invention, as appearing from the FIGS. 2, 3a, 4, the guide plate is divided into a first link portion 8 and a second link portion 10. The link portion 8 is hingedly attached at 9, and the pivot axle, at folded-up focusing hood, is located immediately outside the plane of the back piece 3, see for example FIG. 2. The free end of the link portion 8 is divided into two supporting surfaces 8'. A distance beneath half the height of the back piece 3 the second link portion 10 is hingedly attached at 11. At its other end, the link portion 10 is hingedly attached at the link portion 8 about a pivot axle 12. Said pivot axle 12 is located between the joint 9 and the free end of the link portion 8 and, seen with folded-up focusing hood, on the same level as half the height of the back piece 3.

At the folding-together procedure, for example, as shown in FIGS. 2, 3a and 4, the link 8 is pivoted to the left, seen in the Figures, and simultaneously the cover 2 is pivoted to the right. The back piece 3 thereby is moved in a parallel movement to the cover while the lateral pieces 4,5 are folded together, see FIG. 1. During this folding-together movement, thus, the supporting surfaces 8 slide along the back piece 3 and move this in the direction to the left (according to the Figures). The link portion 10, which is hingedly connected to the back piece 3 and link portion 8, in each position in respect of the distance of the back piece from the cover and, thus, in the angular position of the link portion 8, will lift the back piece and therewith the focusing hood and in vertical direction guide the movement thereof along a substantially straight path.

A direct comparison to FIG. 3b proves that by the invention the height of the frame 1 can be lowered substantially in relation to what is possible with conventional focusing hoods of this type.

The characterizing features of the invention render it possible in an expedient way to build-in a magnifier in the cover of the focusing hood, as shown in FIGS. 5-7. In the cover inside the lateral pieces a mounting plate 13 is located. This plate is hingedly suspended on a pair of flanges 14 located at the cover. A torsion spring 15 of conventional type is mounted on the axle of the plate and tends to swing the mounting plate 13 out to a position substantially perpendicular to the cover 2. The plate 13 is provided with a pin 16 having an outward cone-shaped head 17, and is provided at the opposed edges with a pair of guides 18 in the form of folds of the sheet metal material. 19 designates a holder with a magnifier, which holder is provided with a notch 20 and intended with friction fit to be moved in between the guides 18. The cover 2 further is provided with a control button 21, which in a way suitable for the expert and not shown here is guided movably in the cover and pressed by a spring (not shown) to a stop to the right, see FIG. 7. The control button includes a portion 22 with a shoulder, which is intended by snap-in action to catch behind the edge or rear surface of the head 17 when the mounting plate 13 with its magnifier 19 is pivoted into the cover 2 and thereby to retain the magnifier in folded-in position. By moving the control button 21 to the left (FIG. 7), the portion 22 with its shoulder is released from the edge of the head 17, which results in that the mounting plate 13 with magnifier 19 by the spring 15 is pivoted up in the horizontal position in the focusing hood. As is understood, it is very simple to exchange the holder with magnifier at demand, for example depending on visual defect of the user.

What I claim is:

1. A focusing hood for a camera having a box comprising a cover hingedly attached to the camera box and adapted to be folded-up, and a lateral piece and a back piece mounted to the cover, the lateral piece being divided into a front lateral piece portion and a rear lateral piece portion pivotally connected to said front lateral piece portion, and the back piece pivotally connected to said rear lateral piece portion and connected to the box by a link hinged at the box and back piece, characterized in that the link comprises a first link portion hingedly mounted at the box, and a second link portion hingedly mounted on the back piece at a level vertically beneath the center of the back piece, and said second link portion being hingedly mounted to the first link portion at a pivot point substantially on a level at half the height of the back piece when said first link portion is substantially perpendicular to said back piece.

2. A focusing hood as defined in claim 1, characterized in that the first link portion extends adjacent and substantially in parallel with the back piece in a folded position of said hood and has a free end portion extending beyond said pivot point.

3. A focusing hood as defined in claim 2, characterized in that the free end portion includes a terminus which forms a supporting portion, which abuts the back piece when said first link portion is substantially perpendicular to said back piece.

4. A focusing hood as defined in claim 1,2, or 3, characterized in that the second link portion as hingedly mounted on the back piece at a location substantially at one quarter of the height of the back piece.

5. A focusing hood as defined in claim 1, characterized in that it further comprises a mounting plate located in the cover and hinged at a pivot located adjacent a free edge thereof and provided with means for engaging with snap-in means releasably arranged in the cover for locking the mounting plate in a position folded into the cover.

6. A focusing hood as defined in claim 5, characterized in that the mounting plate is provided with guides extending transversely to said pivot for releasable mounting of a holder provided with a magnifier.

7. A focusing hood as defined in claim 5 or 6, characterized in that the snap-in means consist of a control button, which is movable along the free edge and includes a portion with a shoulder provided with snap-in action to engage with the means for engagement of the mounting plate.

* * * * *